(12) United States Patent
Tomiuga

(10) Patent No.: US 9,581,217 B2
(45) Date of Patent: Feb. 28, 2017

(54) SHOCK ABSORBER

(71) Applicant: KAYABA INDUSTRY CO., LTD., Tokyo (JP)

(72) Inventor: Takeshi Tomiuga, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/408,578

(22) PCT Filed: Mar. 26, 2014

(86) PCT No.: PCT/JP2014/058532
§ 371 (c)(1),
(2) Date: Dec. 17, 2014

(87) PCT Pub. No.: WO2014/157336
PCT Pub. Date: Oct. 2, 2014

(65) Prior Publication Data
US 2015/0184715 A1 Jul. 2, 2015

(30) Foreign Application Priority Data
Mar. 28, 2013 (JP) .................. 2013-068443

(51) Int. Cl.
*F16F 9/36* (2006.01)
*B62K 25/04* (2006.01)
(Continued)

(52) U.S. Cl.
CPC ............... *F16F 9/36* (2013.01); *B62K 25/04* (2013.01); *B62K 25/08* (2013.01); *F16F 9/18* (2013.01); *F16F 9/32* (2013.01); *F16F 9/366* (2013.01)

(58) Field of Classification Search
CPC .. B62K 25/04; B62K 25/08; B62K 2025/048; F16F 9/06; F16F 9/32;
(Continued)

(56) References Cited

U.S. PATENT DOCUMENTS 5,333,708 A * 8/1994 Jensen ..................... F16F 9/516
188/284
6,234,505 B1 * 5/2001 Ito ........................... B62K 25/08
188/322.17

(Continued)

FOREIGN PATENT DOCUMENTS

JP 2005-030534 A 2/2005
JP 3873192 B2 1/2007
(Continued)

*Primary Examiner* — Robert A Siconolfi
*Assistant Examiner* — San Aung
(74) *Attorney, Agent, or Firm* — Rabin & Berdo, P.C.

(57) ABSTRACT

A shock absorber includes a shock absorber body interposed between a vehicle body and a wheel, a cylinder connected to a wheel side and standing in a shaft center portion of the shock absorber body, a liquid chamber formed in the cylinder and filled with an operating liquid, an annular rod guide fixed to the cylinder and closing a liquid chamber's vehicle body side, a piston rod connected to a vehicle body side, penetrating a shaft center portion of the rod guide, and going into and out of the cylinder, an annular seal member held on a rod guide's inner periphery and in sliding contact with a piston rod's outer peripheral surface, and a relief portion formed on a piston rod's outer periphery and forming a gap between the piston rod and the seal member when the piston rod retreats from the cylinder by a predetermined amount.

8 Claims, 3 Drawing Sheets

(51) Int. Cl.
*B62K 25/08* (2006.01)
*F16F 9/18* (2006.01)
*F16F 9/32* (2006.01)

(58) Field of Classification Search
CPC ...... F16F 9/36; F16F 9/43; F16F 9/366; F16F 9/462; F16F 9/516; F16F 9/49; F16F 9/585
USPC ........ 188/297, 313–317, 310, 319.1, 322.13, 188/322.15, 283, 284, 288, 289; 267/64.26
See application file for complete search history.

(56) References Cited

U.S. PATENT DOCUMENTS

| | | | |
|---|---|---|---|
| 2002/0040833 A1* | 4/2002 | Furuya | B62K 25/08 188/322.22 |
| 2004/0226790 A1 | 11/2004 | Yoshimoto | |
| 2009/0107783 A1* | 4/2009 | Ota | B60G 13/08 188/313 |
| 2010/0059321 A1* | 3/2010 | Boivin | F16F 9/49 188/284 |
| 2010/0294606 A1* | 11/2010 | Nagai | F16F 9/36 188/314 |
| 2012/0187651 A1* | 7/2012 | Wimmer | B62K 25/08 280/276 |
| 2013/0153348 A1* | 6/2013 | Sumida | B62K 25/08 188/314 |

FOREIGN PATENT DOCUMENTS

| | | |
|---|---|---|
| JP | 2010-144812 | 7/2010 |
| JP | 2010-270832 A | 12/2010 |
| JP | 2011-117533 A | 6/2011 |

\* cited by examiner

VEHICLE BODY SIDE

WHEEL SIDE

FIG. 1

SHOCK ABSORBER

TECHNICAL FIELD

The present invention relates to a shock absorber.

BACKGROUND ART

A shock absorber for damping vibration of a vehicle, equipment, a structure and the like is known. The shock absorber is used for a saddle-type vehicle such as a bicycle, a tricycle and the like, for example. Such a shock absorber is composed of an outer tube and an inner tube going into and out of this outer tube. A telescopic shock absorber body which becomes an outer shell of the shock absorber is provided, and the shock absorber body accommodates a suspension spring for elastically supporting a vehicle body. Such a shock absorber generates a damping force for suppressing a telescopic motion of the shock absorber body.

In some cases, such a shock absorber is provided with a cylinder a rod guide, a piston rod, a piston, a piston passage, a damping valve, a free piston, urging means, and a relief portion which will be explained below.

The cylinder stands in a shaft center portion of the shock absorber body. In the cylinder, a liquid chamber filled with an operating liquid therein is formed. The rod guide has an annular shape, fixed to the cylinder and closes one side of the liquid chamber. The piston rod penetrates the rod guide and goes into and out of the cylinder with extension and contraction of the shock absorber body. The piston is held at a distal end portion of the piston rod and divides the liquid chamber into a rod-side chamber and a piston-side chamber. The piston passage is formed in the piston and has the rod-side chamber and the piston-side chamber communicate with each other. The damping valve applies resistance to the operating liquid passing through the piston passage. The free piston is in sliding contact with a portion on a side opposite to the piston rod side in an inner peripheral surface of the cylinder and closes the other side of the liquid chamber. The urging means urges the free piston to the liquid chamber side. The relief portion allows the operating liquid in the cylinder to escape to an outside of the cylinder when the free piston retreats by a predetermined amount against an urging force of the urging means. That is, it relieves the operating liquid.

In the above-described shock absorber, at the time of extension and contraction of the shock absorber when the piston rod goes into and out of the cylinder, the operating liquid in one of the chambers pressurized by the piston passes through the piston passage and moves to the other chamber. As a result, a damping force caused by resistance of the damping valve is generated. Moreover, in the above-described shock absorber, the urging means pressurizes the liquid chamber. As a result, in the above-described shock absorber, responsiveness of generation of the damping force is made favorable. In the above-described shock absorber, even if the operating liquid in the cylinder increases or swells, the relief portion suppresses an excessive rise of a cylinder internal pressure. Such a shock absorber is disclosed in JP2005-30534A, JP2010-270832A, and JP2011-117533A, for example.

SUMMARY OF INVENTION

A gas remaining in the liquid chamber when the operating liquid is poured or air bubbles emerging by deposition of the gas dissolved in the operating liquid move upward in the liquid chamber and gather on an upper end of the liquid chamber. Thus, the shock absorber is set to an inverted type in general, and the relief portion is arranged on an upper side. In this case, the gas gathered on the upper end of the liquid chamber can be discharged to the outside of the cylinder together with the operating liquid at relief.

However, if the shock absorber is set to the inverted type, the piston rod is connected to a wheel side. In this case, a pushrod inserted into the piston rod and an adjuster for adjusting the damping force which drives a valve body are also arranged on the wheel side. As a result, an operation of the adjuster for adjusting the damping force becomes difficult. Moreover, if a suspension spring is composed of a coil spring, the suspension spring is interposed between a wheel-side bracket which closes a wheel-side opening of a suspension device body and the rod guide. In this case, an adjuster for adjusting a reaction force which adjusts the reaction force of the suspension spring is also arranged on the wheel side. As a result, an operation of the adjuster for adjusting a reaction force becomes difficult, and a replacement work of the suspension spring also becomes difficult.

Thus, it is required that the shock absorber is an upright type so that operations of each of the adjusters can be performed from the vehicle body side or replacement of the suspension spring is facilitated. However, if the general shock absorber as described above is made the upright type as it is, the relief portion is arranged on a lower side, and the gas gathers in the rod-side chamber which comes to the upper end of the liquid chamber. In this case, the relief portion cannot discharge the gas in the rod-side chamber to the outside of the cylinder at relief. Thus, in this case, there is a concern that, at the time of extension of the shock absorber when the rod-side chamber is pressurized, an extension-side damping force cannot be generated quickly. As a result, there is a concern that generation of the extension-side damping force is delayed.

The present invention has an object to provide a shock absorber which can discharge the gas in the cylinder to the outside of the cylinder even if the shock absorber is made the upright type and can suppress a delay in generation of the extension-side damping force.

The shock absorber of an aspect of the present invention includes a shock absorber body composed of an outer tube and an inner tube going into and out of the outer tube and interposed between a vehicle body and a wheel, a cylinder connected to a side of the wheel and standing in a shaft center portion of the shock absorber body, a liquid chamber formed in the cylinder and filled with an operating liquid, an annular rod guide fixed to the cylinder and closing a vehicle body side of the liquid chamber, a piston rod connected to a vehicle body side, penetrating a shaft center portion of the rod guide, and going into and out of the cylinder, an annular seal member held on an inner periphery of the rod guide and in sliding contact with an outer peripheral surface of the piston rod, and a relief portion formed on an outer periphery of the piston rod and forming a gap between the piston rod and the seal member when the piston rod retreats from the cylinder by a predetermined amount.

BRIEF DESCRIPTION OF DRAWINGS

FIG. 1 is a front view of a shock absorber according to an embodiment illustrated in a partially broken manner.

DESCRIPTION OF EMBODIMENTS

Figure 2:
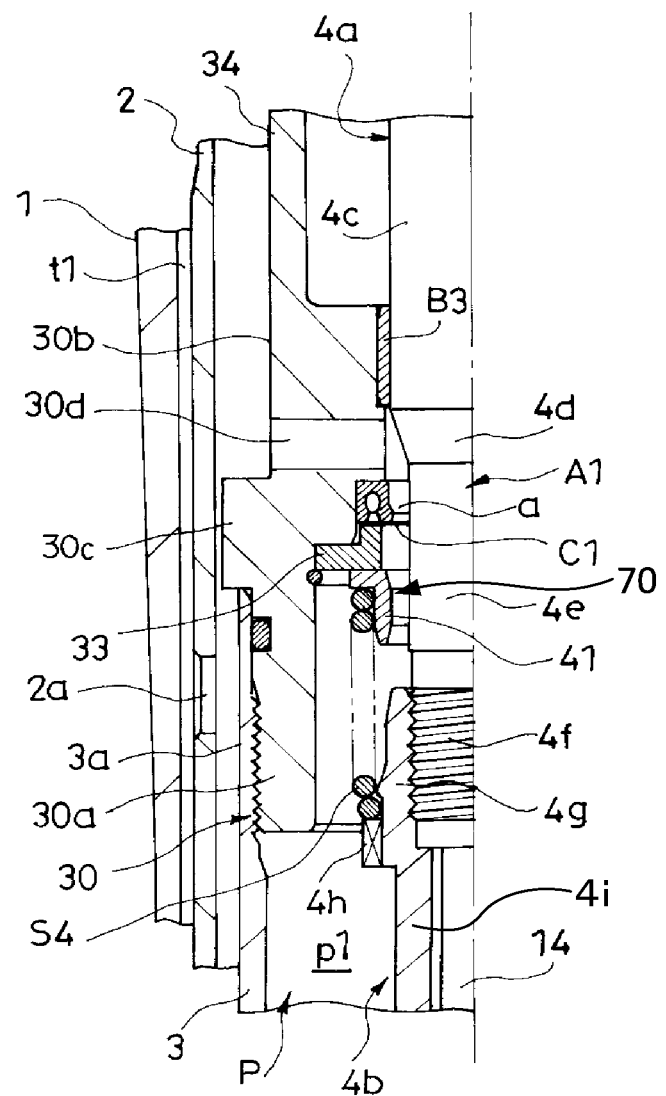
FIG. 2 is a view of a major part of FIG. 1 illustrated in an enlarged manner.

An embodiment of the present invention will be explained below by referring to the attached drawings. The same reference numerals given throughout some figures indicate the same or corresponding components.

Figure 1:
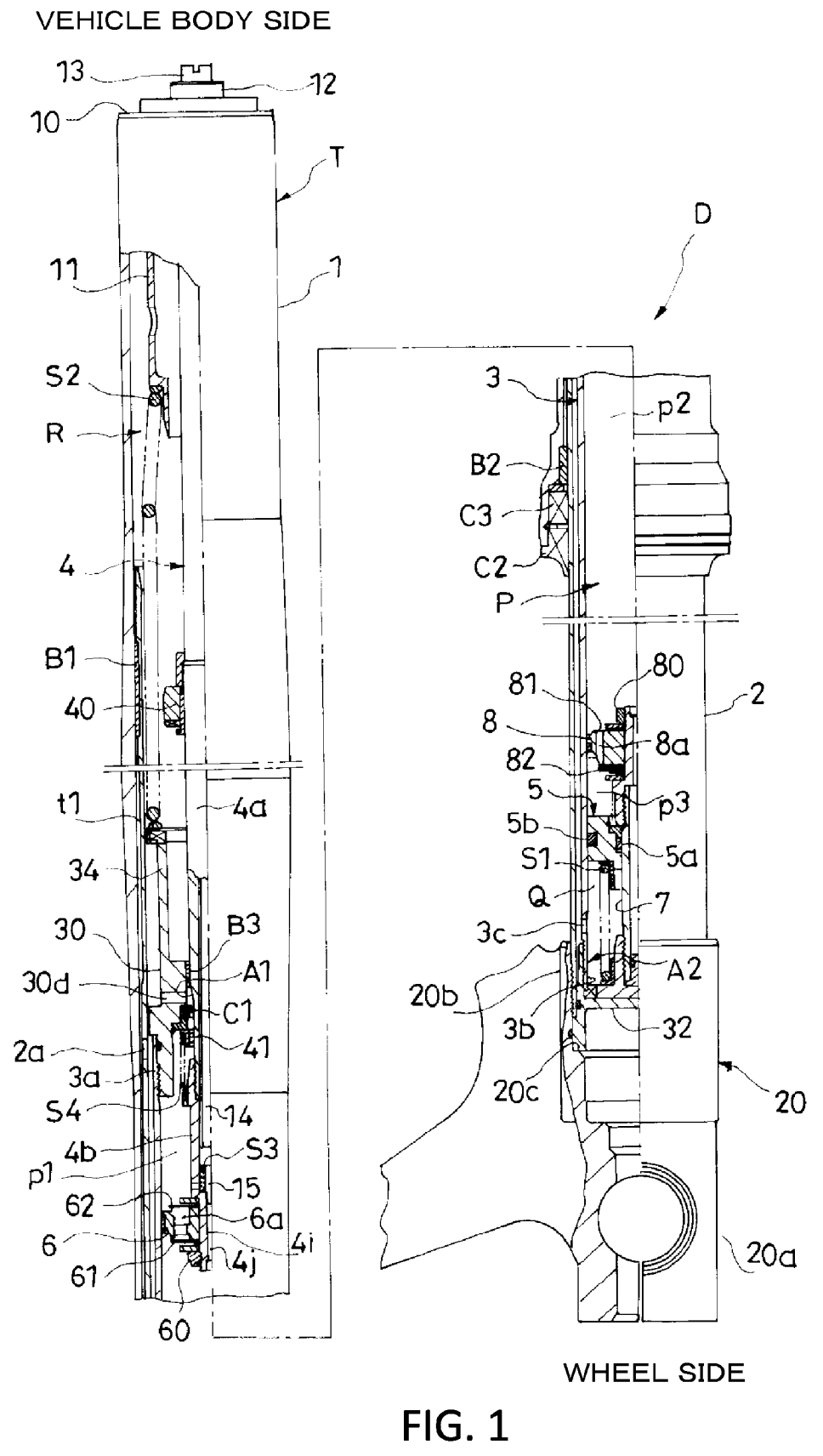

As illustrated in FIG. 1, a shock absorber D according to this embodiment includes a shock absorber body T, cylinder 3, a liquid chamber P, a rod guide 30, a piston rod 4, a seal member C1, and a relief portion A1.

The shock absorber body T is composed of an outer tube 1 and an inner tube 2 going into and out of the outer tube 1 and is interposed between a vehicle body and a wheel. The cylinder 3 is connected to the wheel side and stands in a shaft center portion of the shock absorber body T. The liquid chamber P is formed in the cylinder 3. The liquid chamber P is filled with an operating liquid. The rod guide 30 is fixed to the cylinder 3 and closes the vehicle body side of the liquid chamber P. The rod guide 30 has an annular shape. The rod guide 30 is specifically mounted on an opening end portion 3a of the cylinder 3 on the vehicle body side. The piston rod 4 is connected to the vehicle body side, penetrates a shaft center portion of the rod guide 30 and goes into and out of the cylinder 3. The piston rod 4 goes into and out of the cylinder 3 in a state supported by the rod guide 30.

The seal member C1 is held by an inner periphery of the rod guide 30 and in sliding contact with an outer peripheral surface of the piston rod 4. The seal member C1 has an annular shape. The relief portion A1 is formed on an outer periphery of the piston rod 4. The relief portion A1 forms a gap "a" illustrated in FIG. 2 between the piston rod 4 and the seal member C1 when the piston rod 4 retreats from the cylinder 3 by a predetermined amount.

The shock absorber D is used for a front fork suspending a front wheel in a saddle-type vehicle such as a bicycle, a tricycle and the like. The front fork includes a pair of shock absorbers standing on both sides of the front wheel. In FIG. 1, one shock absorber D of the pair of shock absorbers is illustrated, while the other shock absorber is not shown. The front fork includes a vehicle-body side bracket connecting the pair of shock absorbers and connected to a vehicle body frame which forms a frame of the vehicle body and a wheel-side bracket 20 connecting the pair of shock absorbers to an axle of the front wheel, respectively.

The shock absorber D can be applied to at least one of the pair of shock absorbers constituting the front fork. The shock absorber D may be used for those other than the front fork. For example, the shock absorber D may be used for a rear cushion suspending a rear wheel in a saddle-type vehicle. The shock absorber D may be also used for a vehicle other than the saddle-type vehicle.

The shock absorber D will be further explained below. The shock absorber D further includes a piston 6, a base rod 7, a base member 8, a free piston 5, and urging means S1.

The piston 6 is held at a distal end portion of the piston rod 4. The piston 6 is constituted in sliding contact with an inner peripheral surface of the cylinder 3 and movably in an axial direction in the cylinder 3. The base rod 7 stands in the shaft center portion of the cylinder 3. The base rod 7 stands in a portion on a side opposite to a side of the piston rod 4 in the shaft center portion of the cylinder 3. The base member 8 is held at a distal end portion of the base rod 7. The free piston 5 is constituted in sliding contact with an outer peripheral surface of the base rod 7 and the inner peripheral surface of the cylinder 3 and movably in the axial direction in the cylinder 3. The free piston 5 is specifically in sliding contact with a portion on a side opposite to the side of the piston rod 4 in the inner peripheral surface of the cylinder 3. The free piston 5 is formed in an annular shape.

A reservoir R is formed between the shock absorber body T and the cylinder 3. The operating liquid is reserved in the reservoir R and a gas is also stored. The gas is stored on a liquid level of the operating liquid. Between the outer tube 1 and the inner tube 2, a cylindrical gap t1 is formed. The cylindrical gap t1 is specifically formed in an overlapping portion between the outer tube 1 and the inner tube 2. In the inner tube 2, a communication hole 2a is formed. The communication hole 2a is constituted so that the operating liquid can freely move between the cylindrical gap t1 and the reservoir R.

In the cylinder 3, the liquid chamber P and a rear surface chamber Q are formed. The liquid chamber P is divided by the rod guide 30 from the reservoir R. The liquid chamber P is constituted by a rod-side chamber p1, a piston-side chamber p2, and a liquid reservoir chamber p3. The rod-side chamber p1 is divided by the piston 6 to an upper side. The piston-side chamber p2 is divided by the piston 6 to a lower side and also divided by the base member 8 to the upper side. The liquid reservoir chamber p3 is divided by the base member 8 from the piston-side chamber p2. The liquid chamber P is divided by the free piston 5 from the rear surface chamber Q. In the rear surface chamber Q, the urging means S1 is accommodated. The urging means S1 urges the free piston 5 to the liquid chamber P side. The operating liquid is filled in the liquid chamber P and the rear surface chamber Q.

The shock absorber body T constitutes an outer shell of the shock absorber D. The shock absorber D has a telescopic structure composed of the outer tube 1 and the inner tube 2. To the outer tube 1, the vehicle-body side bracket is fixed, while to the inner tube 2, the wheel-side bracket 20 is fixed. Thus, if an impact by irregularity on a road surface is inputted to a wheel, the inner tube 2 goes into and out of the outer tube 1, whereby the shock absorber body T is extended and contracted.

The cap member 10, the wheel-side bracket 20, the seal member C2, and the seal member C3 prevent leakage of a liquid or a gas stored in the shock absorber body T to an outside air side. The cap member 10 is screwed with an inner periphery of an upper end portion of the outer tube 1 and closes an upper opening of the shock absorber body T. The wheel-side bracket 20 is screwed with an outer periphery of a lower end portion of the inner tube 2 and closes a lower opening of the shock absorber body T. The seal member C2 and the seal member C3 are held by the inner periphery of the outer tube 1 and in sliding contact with an outer peripheral surface of the inner tube 2. The seal member C2 and the seal member C3 are made of annular dust seal and oil seal and close a lower opening of the cylindrical gap t1.

In the shock absorber body T, the suspension spring S2 is accommodated. The suspension spring S2 urges the shock absorber body T in an extending direction and elastically supports the vehicle body. In this embodiment, the suspension spring S2 is a coil spring. In this embodiment, the suspension spring S2 is supported on a lower end by a cylindrical oil lock case 34 standing on the rod guide 30 and is supported on an upper end by a cylindrical spring receiver 11. The suspension spring S2 may be an air spring, for example. The suspension spring S2 does not have to be accommodated in the shock absorber body T.

An adjuster 12 for adjusting a reaction force adjusts the reaction force of the suspension spring S2 by driving the spring receiver 11 vertically in FIG. 1, that is, in the axial direction of the shock absorber body T. The adjuster 12 is mounted on the cap member 10.

In the cylindrical gap t1, a pair of bush B1 and bush B2 are arranged. The bush B1 and the bush B2 pivotally support the inner tube 2 capable of going into and out of the outer tube 1. In the cylindrical gap t1, the operating liquid is stored, and the operating liquid is supplied from the communication hole 2a. Thus, sliding surfaces of the bush B1 and the bush B2 are lubricated by the operating liquid.

The wheel-side bracket 20 includes a connection portion 20a and a cylindrical portion 20b. The connection portion 20a is connected to the axle. The cylindrical portion 20b stands from the connection portion 20a. With an inner periphery of the cylindrical portion 20b, the inner tube 2 is screwed. On the inner periphery of the cylindrical portion 20b, a stepped surface 20c is formed. On the stepped surface 20c, a bottom member 32 having a cylindrical shape with a bottom is positioned. The bottom member 32 is pressed onto the stepped surface 20c at the distal end of the inner tube 2 and is fixed to the wheel-side bracket 20.

The cylinder 3 is connected to the wheel side. The cylinder 3 is specifically screwed with an inner periphery of the bottom member 32. Therefore, the cylinder 3 is connected to the wheel side through the bottom member 32 and the wheel-side bracket 20 and stands in the shaft center portion of the inner tube 2. In a lower part of the cylinder 3, a large inner-diameter portion 3b and a communication hole 3c are formed. The large inner-diameter portion 3b is formed such that its inner diameter is larger than an inner diameter of the other portion of the cylinder 3. The communication hole 3c penetrates the large inner-diameter portion 3b.

As illustrated in FIG. 2, the rod guide 30 includes an insertion portion 30a, a protrusion portion 30b, and a flange portion 30c. The insertion portion 30a is inserted into the cylinder 3 and is screwed with the inner periphery of the cylinder 3. The protrusion portion 30b continues to the insertion portion 30a and protrudes from the cylinder 3. The flange portion 30c has an annular shape and expands to an outer periphery from the protrusion portion 30b.

In the protrusion portion 30b, a lateral hole 30d is formed. The lateral hole 30d is opened on an outer side of the cylinder 3 and is also opened between the seal member C1 and the bush B3. The lateral hole 30d is formed along a radial direction of the protrusion portion 30b. The lateral hole 30d, the seal member C1, and the bush B3 are provided specifically as follows. That is, the lateral hole 30d penetrates in the radial direction above the flange portion 30c. In the inner periphery of the rod guide 30, the bush B3 is fitted above the lateral hole 30d, and the seal member C1 is held below the lateral hole 30d. The bush B3 has an annular shape and is in sliding contact with the outer peripheral surface of the piston rod 4.

A stopper 33 is held below the lateral hole 30d on the inner periphery of the rod guide 30. The stopper 33 is held side by side with the seal member C1 in a vertical direction, that is, in the axial direction. The stopper 33 has an annular shape. Above the protrusion portion 30b, an oil lock case 34 stands upright. The oil lock case 34 has a cylindrical shape. Together with an oil lock piece 40 illustrated in FIG. 1, the oil lock case 34 constitutes an oil lock mechanism for relaxing an impact when the shock absorber D is compressed to the maximum. The oil lock piece 40 is mounted on the outer periphery of the piston rod 4.

The piston rod 4 is held in a state suspended by the cap member 10. The piston rod 4 is connected to the vehicle body side through the cap member 10, the outer tube 1, and the vehicle-body side bracket. A portion on a lower side of the piston rod 4 penetrates the shaft center portion of the rod guide 30 and is pivotally supported by the rod guide 30 through the bush B3 movably in the axial direction.

The piston rod 4 is constituted by a shaft member 4a and a center rod 4b. The shaft member 4a has a cylindrical shape and is supported by the rod guide 30. As illustrated in FIG. 2, the shaft member 4a includes a large diameter portion 4c, a slope portion 4d, a small diameter portion 4e, and a screw portion 4f. The large diameter portion 4c has a columnar shape. The large diameter portion 4c is in sliding contact with the bush B3. The slope portion 4d has a conical shape. The slope portion 4d has its diameter gradually reduced in the axial direction of the piston rod 4 toward the wheel side. Specifically, the slope portion 4d continues to the large diameter portion 4c from a lower side in FIG. 2, that is, from the wheel side and has its diameter gradually reduced as above from the large diameter portion 4c. The small diameter portion 4e has a columnar shape. The small diameter portion 4e continues to the slope portion 4d from the lower side in FIG. 2, that is, from the wheel side. An outer diameter of the small diameter portion 4e is formed smaller than an outer diameter of the large diameter portion 4c. The screw portion 4f continues to the small diameter portion 4e from the lower side in FIG. 2, that is, from the wheel side. With the outer periphery of the screw portion 4f, the center rod 4b is screwed.

The center rod 4b has an annular shape and holds the piston 6. The center rod 4b includes a nut portion 4g, a seat portion 4h, and a holding portion 4i. The nut portion 4g is screwed with the screw portion 4f. The seat portion 4h extends to the outer periphery from the nut portion 4g. The holding portion 4i continues to the nut portion 4g from the lower side in FIG. 2, that is, from the wheel side and holds the piston 6.

If the seal member C1 is faced with the large diameter portion 4c, the seal member C1 is in sliding contact with the large diameter portion 4c. Thus, no gap is formed on the inner periphery of the seal member C1. When the seal member C1 reaches the slope portion 4d, the gap "a" is formed on the inner periphery of the seal member C1. The piston rod 4 can stroke until the seal member C1 is faced with the small diameter portion 4e. Even if the seal member C1 is faced with the small diameter portion 4e, the gap "a" is formed on the inner periphery of the seal member C1.

That is, in this embodiment, the slope portion 4d and the small diameter portion 4e constitute the relief portion A1. The relief portion A1 forms the gap "a" between the seal member C1 and the piston rod 4 within a predetermined stroke range since the piston rod 4 retreats from the cylinder 3 by a predetermined amount and the slope portion 4d reaches the seal member C1 until the time of maximum extension when the piston rod 4 retreats from the cylinder 3 the most. The relief portion A1 relieves the operating liquid in the cylinder 3 to the outside of the cylinder 3 through the gap "a" and the lateral hole 30d by forming the gap "a" as above. That is, it relieves the operating liquid.

Moreover, in this embodiment, the relief portion A1 is set so as to form the gap "a" when only a vehicle body load is applied to the shock absorber D. Specifically, if an occupant gets off the vehicle and the shock absorber D extends, only the vehicle body load is applied to the shock absorber D. Then, the relief portion A1 is set so as to be faced with the seal member C1 at this time and to form the gap "a" between itself and the seal member C1. Thus, the relief portion A1 relieves the operating liquid in the cylinder 3 to the outside of the cylinder 3 during parking of a vehicle when only the vehicle body load is applied to the shock absorber D. A range in which the relief portion A1 is provided is not limited to the above but can be changed as appropriate. Moreover, a stroke range in which the relief portion A1 operates can be changed as appropriate.

Subsequently, the piston rod 4 will be further explained. Into the shaft member 4a, a pushrod 14 is inserted. The pushrod 14 is driven in the axial direction by an adjuster 13 for adjusting a damping force. The adjuster 13 is mounted on the cap member 10. In the center rod 4b, a bypass path 4j is formed and a needle valve 15 and an urging spring S3 are accommodated. The bypass path 4j has the rod-side chamber p1 and the piston-side chamber p2 communicate with each other. The needle valve 15 narrows the bypass path 4j. The urging spring S3 urges the needle valve 15 to the pushrod 14 side.

A channel area of the bypass path 4j is changed by driving the pushrod 14 through an operation of the adjuster 13. Specifically, the channel area of the bypass path 4j is narrowed by pushing the needle valve 15 into the bypass path 4j by driving the pushrod 14 and is widened by making the needle valve 15 retreat from the bypass path 4j.

As illustrated in FIG. 2, a rebound member 70 is mounted on the outer periphery of the piston rod 4. The rebound member 70 absorbs an impact when the shock absorber D extends to the maximum. The rebound member 70 is constituted by a coil spring S4 and a spring guide 41. The coil spring S4 is fitted around an outer periphery of the nut portion 4g and is supported by the seat portion 4h from below. The spring guide 41 is formed annularly and is fitted in an upper end portion of the coil spring S4. The spring guide 41 is constituted movably in the axial direction with respect to the outer periphery of the shaft member 4a.

When the shock absorber D extends to the maximum and the spring guide 41 is brought into contact with the stopper 33, the coil spring S4 is compressed. As a result, the coil spring S4 generates a predetermined reaction force. When the relief portion A1 is faced with the seal member C1, the spring guide 41 is also faced with the relief portion A1. Thus, at this time, a gap is formed between an inner periphery of the spring guide 41 and the relief portion A1. Therefore, even when the spring guide 41 is brought into contact with the stopper 33, communication between an inside and an outside of the cylinder 3 through the gap "a" is not prevented.

As illustrated in FIG. 1, the piston 6 is fixed to an outer periphery of the holding portion 4i by a nut 60. In the piston 6, a piston passage 6a is formed. The piston passage 6a has the rod-side chamber p1 and the piston-side chamber p2 communicate with each other. The piston passage 6a is specifically a piston passage on an extension side. In the piston 6, a piston passage on a compression side, not shown, is also formed. The piston passage on the compression side also has the rod-side chamber p1 and the piston-side chamber p2 communicate with each other.

In the piston 6, an extension-side damping valve 61 and a compression-side check valve 62 are provided. The extension-side damping valve 61 and the compression-side check valve 62 are stacked. The extension-side damping valve 61 closes an outlet of the piston passage 6a capable of opening and closing. The extension-side damping valve 61 allows only a flow of the operating liquid moving through the piston passage 6a from the rod-side chamber p1 to the piston-side chamber p2 and prevents a flow in the opposite direction. The compression-side check valve 62 closes an outlet of the piston passage on the compression side capable of opening and closing. The compression-side check valve 62 allows only a flow of the operating liquid moving through the piston passage on the compression side from the piston-side chamber p2 to the rod-side chamber p1 and prevents a flow in the opposite direction.

The base rod 7 is held in a state standing on the bottom member 32. The base member 8 is fixed to a distal end portion of the base rod 7 by a nut 80. In the base member 8, a base passage 8a is formed. The base passage 8a has the piston-side chamber p2 and the liquid reservoir chamber p3 communicate with each other. The base passage 8a is specifically a base passage on an extension side. In the base member 8, a base passage on a compression side, not shown, is also formed. The base passage on the compression side also has the piston-side chamber p2 and the liquid reservoir chamber p3 communicate with each other.

In the base member 8, an extension-side check valve 81 and a compression-side damping valve 82 are provided. The extension-side check valve 81 and the compression-side damping valve 82 are stacked. The extension-side check valve 81 closes an outlet of the base passage 8a capable of opening and closing. The extension-side check valve 81 allows only a flow of the operation liquid moving through the base passage 8a from the liquid reservoir chamber p3 to the piston-side chamber p2 and prevents a flow in the opposite direction. The compression-side damping valve 82 closes an outlet of the base passage on the compression side capable of opening and closing. The compression-side damping valve 82 allows only a flow of the operating liquid moving through the base passage on the compression side from the piston-side chamber p2 to the liquid reservoir chamber p3 and prevents a flow in the opposite direction.

The free piston 5 includes an inner peripheral seal 5a and an outer peripheral seal 5b. The inner-peripheral seal 5a is constituted by an annular O-ring in sliding contact with the outer peripheral surface of the base rod 7. The outer peripheral seal 5b is constituted by an annular O-ring in sliding contact with the inner peripheral surface of the cylinder 3. The free piston 5 closes the liquid chamber P on the wheel side.

When the free piston 5 moves to a lower side in FIG. 1, that is, to the wheel side by a predetermined amount and the outer-peripheral seal 5b reaches the large inner-diameter portion 3b, a gap is generated between the outer-peripheral seal 5b and the cylinder 3. As a result, the operating liquid in the liquid reservoir chamber p3 can be made to escape to the reservoir R through the gap and the communication hole 3c. That is, in this embodiment, the large inner-diameter portion 3b also functions as a relief portion A2 for allowing the operating liquid in the cylinder 3 to escape to the outside of the cylinder 3. Therefore, the shock absorber D of this embodiment includes the upper-side relief portion A1 formed on the piston rod 4 and the lower-side relief portion A2 formed on the cylinder 3.

The urging means S1 is constituted by a coil spring in this embodiment. The urging means S1 is accommodated in the rear surface chamber Q and is also interposed between the bottom member 32 and the free piston 5 in a compressed state. The urging means S1 pressurizes the liquid chamber P through the free piston 5 and makes responsiveness of damping force generation in the shock absorber D favorable.

An operation of the shock absorber D in this embodiment will be explained below.

When the shock absorber D extends, the inner tube 2 retreats from the outer tube 1 and the piston rod 4 retreats from the cylinder 3. When the shock absorber D extends and the seal member C1 is faced with the large diameter portion 4c, the operating liquid in the rod-side chamber p1 pressurized by the piston 6 passes through the piston passage 6a and the bypass path 4j and moves to the piston-side chamber p2. In this case, the operating liquid in an amount corresponding to a volume for a portion of the piston rod 4 retreating from the cylinder 3 passes through the base passage 8a and moves from the liquid reservoir chamber p3 to the piston-side chamber p2. Thus, the shock absorber D generates an extension-side damping force caused by resistance of the extension-side damping valve 61, the needle valve 15, and the extension-side check valve 81.

A valve-opening pressure of the extension-side check valve 81 is set low. Thus, the above-described extension-side damping force is generated mainly by resistance of the extension-side damping valve 61 and the needle valve 15. The resistance by the needle valve 15 can be adjusted by the adjuster 13. Thus, the extension-side damping force can be adjusted by the adjuster 13. Moreover, in this case, the free piston 5 moves to the upper side in FIG. 1, that is, to the vehicle body side and contracts the liquid reservoir chamber p3 and also enlarges the rear surface chamber Q. Thus, the operating liquid of the reservoir R moves to the rear surface chamber Q through the communication hole 3c.

When the shock absorber D extends, if the piston rod 4 retreats from the cylinder 3 by a predetermined amount, the relief portion A1 is faced with the seal member C1. As a result, the gap "a" is formed between the piston rod 4 and the seal member C1. Then, the operating liquid in the rod-side chamber p1 passes through the gap "a" and the lateral hole 30d and moves to the reservoir R. The gas remaining in the liquid chamber P when the operating liquid is poured or air bubbles emerging by deposition of the gas dissolved in the operating liquid move upward in the liquid chamber P and gather on the rod-side chamber p1 which is an upper end of the liquid chamber P. Thus, the gas is discharged to the outside of the cylinder 3 together with the operating liquid from the gap "a" and the lateral hole 30d. As a result, a delay in generation of the extension-side damping force can be suppressed.

When the rod-side chamber p1 and the reservoir R communicate with each other, the pressure of the rod-side chamber p1 becomes a reservoir pressure, and the extension-side damping force runs short. At this time, the coil spring S4 is compressed and generates a reaction force and compensates for the shortage of the extension-side damping force. Moreover, in this embodiment, during parking of the vehicle when the occupant gets off the vehicle and only the vehicle body load is applied to the shock absorber D, the relief portion A1 allows the operating liquid in the cylinder 3 to escape to the outside of the cylinder 3. As a result, an internal pressure of the cylinder 3 is reset every time the vehicle is parked.

When the shock absorber D is compressed, the inner tube 2 enters into the outer tube 1 and the piston rod 4 enters into the cylinder 3. When the shock absorber D is compressed, the operating liquid of the piston-side chamber p2 pressurized by the piston 6 passes through the piston passage on the compression side, not shown, and the bypass path 4j and moves to the rod-side chamber p1. Then, the operating liquid in an amount corresponding to a volume for a portion of the piston rod 4 entering into the cylinder 3 passes through the base passage on the compression side and moves from the piston-side chamber p2 to the liquid reservoir chamber p3. Thus, the shock absorber D generates a compression-side damping force caused by resistance of the compression-side check valve 62, the needle valve 15, and the compression-side damping valve 82.

The valve-opening pressure of the compression-side check valve 62 is set low. Thus, the above-described compression-side damping force is generated mainly by resistance of the compression-side damping valve 82. When the shock absorber D is compressed, the free piston 5 moves to the lower side in FIG. 1, that is, to the wheel side and as a result, the liquid reservoir chamber p3 is enlarged, and the rear surface chamber Q is contracted. Thus, the operating liquid in the rear surface chamber Q moves to the reservoir R through the communication hole 3c.

If the operating liquid is repeatedly drawn into the cylinder 3 when the piston rod 4 enters, the operating liquid in the cylinder 3 increases or the volume of the operating liquid expands due to a temperature rise in some cases. If an entry amount of the piston rod 4 into the cylinder 3 becomes larger in this state, the free piston 5 largely moves to the lower side in FIG. 1, that is, to the wheel side and the outer-peripheral seal 5b is faced with the relief portion A2. As a result, a gap is generated between the outer-peripheral seal 5b and the cylinder 3, and the operating liquid in the liquid reservoir chamber p3 passes through the gap and the communication hole 3c and moves to the reservoir R. Therefore, an excessive rise of the internal pressure of the cylinder 3 can be suppressed also by the relief portion A2.

Subsequently, a working effect of the shock absorber D in this embodiment will be explained.

In this embodiment, the shock absorber D includes the shock absorber body T, the cylinder 3, the liquid chamber P, the rod guide 30, the piston rod 4, the seal member C1, and the relief portion A1.

According to the above-described configuration, the shock absorber D is set to the upright type in which the piston rod 4 stands on the vehicle body side of the piston 6. Thus, the adjuster 12 and the adjuster 13 can be easily arranged on the vehicle body side. Moreover, replacement of the suspension spring S2 is also facilitated. Furthermore, according to the above-described configuration, the operating liquid in the cylinder 3 can be made to escape from the rod guide 30 side of the liquid chamber P to the outside of the cylinder 3 so that an excessive rise of the internal pressure of the cylinder 3 can be suppressed.

As described above, the gas remaining in the liquid chamber P when the operating liquid is poured or air bubbles emerging by deposition of the gas dissolved in the operating liquid gather on the upper side. Thus, if the shock absorber D is set to the upright type, the gas gathers on the upper end of the rod-side chamber p1. Therefore, by providing the relief portion A1, the shock absorber D can discharge the gas having gathered on the upper end of the rod-side chamber p1 to the outside of the cylinder 3 together with the operating liquid at relief. As a result, the shock absorber D can discharge the gas in the cylinder 3 to the outside of the cylinder 3 even if it is of the upright type, and a delay in generation of the extension-side damping force can be suppressed.

In this embodiment, the relief portion A1 includes the slope portion 4d.

According to the above-described configuration, when the relief portion A1 and the seal member C1 are faced with each other, the gap "a" can be generated between the piston rod 4 and the seal member C1. Then, by using this gap "a", the operating liquid in the rod-side chamber p1 can be discharged to the outside of the cylinder 3. According to the above-described configuration, working for forming the relief portion A1 is also facilitated. Moreover, since the entire periphery of the piston rod 4 has its diameter gradually reduced on the slope portion 4d, the seal member C1 becomes difficult to be damaged.

In the case of only with the relief portion A2, the relief can be performed only in the vicinity of the maximum compression of the shock absorber D. Thus, if the relief portion A1 cannot be made to function regularly, it is likely that the operating liquid in the cylinder 3 increases or expands before reaching relief depending on a running condition of the vehicle. As a result, the internal pressure of the cylinder 3 rises and the damping force becomes higher, and a riding comfort of the vehicle is likely to deteriorate.

By considering such circumstances, in this embodiment, the relief portion A1 is set to form the gap "a" when only the vehicle body load is applied to the shock absorber D.

According to the above-described configuration, the operating liquid in the cylinder 3 can be made to escape to the outside of the cylinder 3 every time the occupant gets off the vehicle and parks the vehicle. As a result, the internal pressure of the cylinder 3 can be reset every time the vehicle is parked, and the riding comfort of the vehicle can be kept favorable.

In this embodiment, the shock absorber D is further provided with the bush B3. The bush B3 is arranged in series with the seal member C1 from the upper sides of the seal member C1 in FIGS. 1 and 2, that is, from the side opposite to the cylinder 3 side. In the rod guide 30, the lateral hole 30d is formed.

According to the above-described configuration, when the seal member C1 and the relief portion A1 are faced with each other and the gap "a" is generated between the piston rod 4 and the seal member C1, the operating liquid and the gas in the cylinder 3 can be reliably made to escape to the outside of the cylinder 3 through the gap "a" and the lateral hole 30d. Moreover, according to the above-described configuration, the bush B3 and the seal member C1 are separated from each other by a portion of the lateral hole 30d. Thus, at the maximum extension of the shock absorber D when the piston rod 4 retreats from the cylinder 3 the most, the relief portion A1 can be easily set so as not to interfere with the bush B3. As a result, the large diameter portion 4c can be brought into sliding contact with the bush B3 all the time, and interference between the relief portion A1 and the bush B3 with each other and occurrence of rattling can be reliably prevented.

Relief can be performed even if the lateral hole 30d is not formed. However, in this case, the operating liquid needs to flow between the bush B3 and the piston rod 4 after passing through the gap "a". Thus, in this case, if a clearance between the bush B3 and the piston rod 4 is small, it is likely that the operating liquid or the gas in the rod-side chamber p1 is not discharged quickly to the outside of the cylinder 3. Moreover, it is also possible to constitute the shock absorber D so that the relief portion A1 reaches the bush B3. That is because the piston rod 4 is supported also by the piston 6.

In this embodiment, the rod guide 30 includes the insertion portion 30a and the protrusion portion 30b. The lateral hole 30d is formed along the radial direction of the protrusion portion 30b.

According to the above-described configuration, even if the lateral hole 30d is opened to the outside of the cylinder 3 and also opened between the seal member C1 and the bush B3, the shape of the lateral hole 30d does not become complicated. As a result, the rod guide 30 and the lateral hole 30d can be formed more easily.

In this embodiment, the shock absorber D is further provided with the free piston 5 and the urging means S1. Thus, the shock absorber D can pressurize the liquid chamber P through the free piston 5 by the urging means S1 so that responsiveness of generation of the damping force can be made favorable.

The embodiment of the present invention was explained above, but the embodiment illustrates only a part of an application example of the present invention and is not intended to limit a technical scope of the present invention to the specific configuration of the embodiment.

Regarding the setting of the inverted type and the upright type of the front fork, in the above-described embodiment, the example of the front fork set to the inverted type in which the outer tube 1 is connected to the vehicle body side and the inner tube 2 is connected to the wheel side is explained. However, the front fork may be set to the upright type in which the outer tube 1 is connected to the wheel side and the inner tube 2 to the vehicle body side, for example.

Figure 3A:
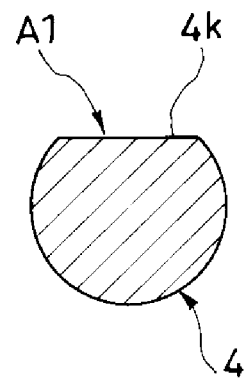
FIG. 3A is a view illustrating a first variation of a relief portion in the shock absorber according to the embodiment and is an enlarged sectional view of a piston rod embodying the variation.
Figure 3B:
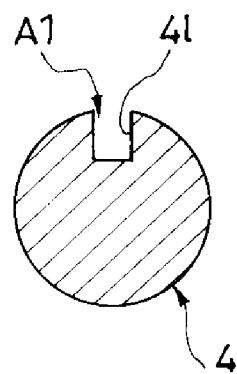
FIG. 3B is a view illustrating a second variation of a relief portion in the shock absorber according to the embodiment and is an enlarged sectional view of a piston rod embodying the variation.

The configuration of the relief portion A1 can be changed as appropriate. For example, in the above-described embodiment, the example in which the relief portion A1 is constituted by the slope portion 4d and the small diameter portion 4e is explained. However, the relief portion A1 may be constituted only by the slope portion 4d, for example. The relief portion A1 may be constituted by a flat plane portion 4k or a groove 4l formed along the axial direction of the piston rod 4 as described in FIG. 3(a) and FIG. 3(b), for example.

The configuration of the rod guide 30 and the shape of the lateral hole 30d may be changed as appropriate. For example, the lateral hole 30d may be formed in an L-shape and may be opened on an upper side and a lateral side (between the seal member C1 and the bush B3) of the rod guide 30.

The present application claims for priority based on Japanese Patent Application No. 2013-068443 filed with Japan Patent Office on Mar. 28, 2013 and all the contents of this application is incorporated in the present description by reference.

The invention claimed is:

1. A shock absorber comprising:
a shock absorber body composed of an outer tube and an inner tube going into and out of the outer tube, the shock absorber body being interposed between a vehicle body on a vehicle body side and a wheel on a wheel side;
a cylinder connected to the wheel side and standing in a shaft center portion of the shock absorber body;
a liquid chamber formed in the cylinder and filled with an operating liquid, the liquid chamber including first and second sides in which the first side is disposed closer to the vehicle body side than the second side;
an annular rod guide fixed to the cylinder and closing the first side of the liquid chamber;
a piston rod connected to the vehicle body side, penetrating a shaft center portion of the rod guide, and going into and out of the cylinder;
an annular seal member held on an inner periphery of the rod guide and in sliding contact with an outer peripheral surface of the piston rod;
an upper-side relief portion formed on an outer periphery of the piston rod and forming a gap between the piston rod and the seal member when the piston rod retreats from the cylinder by a predetermined amount;

a free piston in sliding contact with a portion, on a side opposite to a piston rod side, of an inner peripheral surface of the cylinder, the free piston closing the second side of the liquid chamber;

an urging means adapted to urge the free piston to a side of the liquid chamber;

an extension-side damping valve provided between the piston rod and the free piston;

a compression-side damping valve provided between the piston rod and the free piston; and a lower-side relief portion formed on an inner periphery of the cylinder and forming a gap between the free piston and the cylinder when the free piston moves to the wheel side by a predetermined amount.

2. The shock absorber according to claim 1, wherein the upper-side relief portion includes a slope portion having a diameter gradually reduced toward the wheel side in an axial direction of the piston rod.

3. The shock absorber according to claim 1, wherein the upper-side relief portion is set to form the gap when only a vehicle body load is applied.

4. The shock absorber according to claim 1, further comprising:

an annular bush fitted in an inner periphery of the rod guide and in sliding contact with the outer peripheral surface of the piston rod, wherein the bush is arranged in series with the seal member from a side opposite to a cylinder side; and in the rod guide, a lateral hole opened on an outer side of the cylinder and opened between the seal member and the bush is formed.

5. The shock absorber according to claim 4, wherein the rod guide includes an insertion portion inserted into the cylinder and a protrusion portion continuing to the insertion portion and protruding from the cylinder; and the lateral hole is formed along a radial direction of the protrusion portion.

6. The shock absorber according to claim 1, wherein in the cylinder, a communication hole penetrating the lower-side relief portion is formed.

7. The shock absorber according to claim 1, wherein the lower-side relief portion is a large inner-diameter portion formed such that an inner diameter of the large inner-diameter portion is larger than an inner diameter of another portion of the cylinder.

8. The shock absorber according to claim 1, wherein the extension-side damping valve is an extension-side check valve.

* * * * *